US011347671B2

(12) United States Patent
Liebinger Portela et al.

(10) Patent No.: US 11,347,671 B2
(45) Date of Patent: May 31, 2022

(54) PROTECTING A SYSTEM FROM ATTACK VIA A DEVICE ATTACHED TO A USB PORT

(71) Applicant: KYNDRYL, INC., New York, NY (US)

(72) Inventors: Franz Friedrich Liebinger Portela, San Pablo de Heredia (CR); Cesar Augusto Rodriguez Bravo, Alajuela (CR); Kevin Jimenez Mendez, Heredia (CR)

(73) Assignee: KYNDRYL, INC., New York, NY (US)

( * ) Notice: Subject to any disclaimer, the term of this patent is extended or adjusted under 35 U.S.C. 154(b) by 0 days.

(21) Appl. No.: 16/930,738

(22) Filed: Jul. 16, 2020

(65) Prior Publication Data

US 2022/0019549 A1    Jan. 20, 2022

(51) Int. Cl.
*G06F 13/38* (2006.01)
*G06F 21/85* (2013.01)
(Continued)

(52) U.S. Cl.
CPC ........ *G06F 13/385* (2013.01); *G06F 11/3051* (2013.01); *G06F 21/44* (2013.01);
(Continued)

(58) Field of Classification Search
CPC .... G06F 11/3051; G06F 13/385; G06F 21/44; G06F 21/85; G06F 2213/0042; G06F 2221/2103
See application file for complete search history.

(56) References Cited

U.S. PATENT DOCUMENTS 8,230,149 B1 * 7/2012 Long ............... G06F 13/12
710/305
8,646,082 B2 * 2/2014 Lomont ............ G06F 21/85
726/24
(Continued)

FOREIGN PATENT DOCUMENTS

CN    102368706 A    3/2012
CN    102770850 B    6/2016
(Continued)

OTHER PUBLICATIONS

Axelson, Jan. USB Complete, 3rd ed., 2005, p. 85-91. (Year: 2005).*

(Continued)

*Primary Examiner* — Eric T Oberly
(74) *Attorney, Agent, or Firm* — Ken Han; Andrew M. Calderon; Roberts Calderon Safran & Cole, P.C.

(57) ABSTRACT

A method for protecting a system from a malicious USB device. The method includes one or more computer processors interrupting a universal serial bus (USB) enumeration process corresponding to a first USB device operatively couple to a system. The method further includes determining whether the first USB device is a human interface device (HID) based on a set of descriptor values corresponding to the first USB device. The method further includes responding to determining that that first USB device is a HID by generating a validation challenge. The method further includes presenting the validation challenge to a user of the system. The method further includes responding to determining that the user fulfils one or more actions of the validation challenge by resuming the USB enumeration process corresponding to the first USB device.

20 Claims, 4 Drawing Sheets

(51) Int. Cl.
    *G06F 11/30*    (2006.01)
    *G06F 21/44*    (2013.01)
(52) U.S. Cl.
    CPC ...... *G06F 21/85* (2013.01); *G06F 2213/0042* (2013.01); *G06F 2221/2103* (2013.01)

(56) References Cited

U.S. PATENT DOCUMENTS

| | | | |
|---|---|---|---|
| 2006/0068760 A1* | 3/2006 | Hameed | H04L 63/061 455/412.1 |
| 2007/0208949 A1 | 9/2007 | Lu | |
| 2012/0042099 A1 | 2/2012 | Wong | |
| 2013/0347067 A1* | 12/2013 | Li | G06F 21/31 726/3 |
| 2016/0085704 A1* | 3/2016 | Lida | H04N 21/43632 710/106 |
| 2016/0196454 A1 | 7/2016 | Soffer | |
| 2018/0239719 A1* | 8/2018 | Soffer | G06F 13/105 |
| 2018/0365397 A1* | 12/2018 | Viscarola | G06F 21/44 |
| 2020/0226298 A1* | 7/2020 | Appleboum | G06F 21/577 |

FOREIGN PATENT DOCUMENTS

| | | |
|---|---|---|
| EP | 2136310 A1 | 12/2009 |
| EP | 2958047 B1 | 9/2019 |
| KR | 101697274 B1 | 2/2017 |
| WO | 2019030748 A1 | 2/2019 |
| WO | 2019092729 A1 | 5/2019 |

OTHER PUBLICATIONS

E. L. Loe, H.-C. Hsiao, T. H.-J. Kim, S.-C. Lee and S.-M. Cheng, "SandUSB: An installation-free sandbox for USB peripherals," 2016 IEEE 3rd World Forum on Internet of Things (WF-IoT), 2016, pp. 621-626, doi: 10.1109/WF-IoT.2016.7845512. (Year: 2016).*

"Authorizing (or not) your USB device to connect to the system", Copyright (C) 2007 Inaky Perez-Gonzalez <inaky@linux.intel.com> Intel Corporation, printed from the Internet on Apr. 15, 2020, 3 pps., <https://www.kernel.org/doc/Documentation/usb/authorization.txt>.

"Bad USB, Very Bad USB", May 2, 2016, LMG Security, 13 pps., <https://www.lmgsecurity.com/bad-usb-very-bad-usb/>.

"Libraries Gluing USB Ports and Other Outdated Endpoint Protection Solutions", SentinelOne, Sep. 30, 2016, 3 pps., <https://www.sentinelone.com/blog/outdated-endpoint-protection-solutions/>.

"Make your own DIY USB Rubber Ducky", BehindTheSciences.com, May 12, 2017, 18 pps., <https://behindthesciences.com/electronics/make-your-own-diy-usb-rubber-ducky/>.

"PC Guardian Introduces USB Port Security System to Prevent Unauthorized Data Transfer & Reduce the Risk of Data Theft", Cision PRWeb, Feb. 9, 2007, 4 pps., <https://www.prweb.com/releases/2007/02/prweb503833.htm>.

"Total USB Security", May 7, 2007, Copyright Xavier Mertens © 2003-2020, 12 pps., <https://blog.rootshell.be/2007/05/07/total-usb-security/>.

"Trusted Reviews—Independent Tech News and Reviews", web page, printed from the Internet on Jun. 28, 2020, 3 pps., <https://www.theinquirer.net/>.

"Universal Serial Bus (USB)", Device Class Definition for Human Interface Devices (HID) Firmware Specification—Jun. 27, 2001, Version 1.11, 98 pps., <https://www.usb.org/developers/hidpage/HID1_11.pdf>.

"USB human interface device class", From Wikipedia, the free encyclopedia, last edited on Jun. 19, 2020, 6 pps., <https://en.wikipedia.org/wiki/USB_human_interface_device_class>.

"USB Port Lock", PadJack Port & Cable Physical Network Security, Copyright © 2020 PadJack Inc., 3 pps., <https://www.padjack.com/order-now/usb-port-lock/>.

"USB Rubber Ducky", Hak5, downloaded from the Internet on Jun. 27, 2020, 8 pps, <https://shop.hak5.org/products/usb-rubber-ducky-deluxe>.

"USB-Rubber-Ducky-Clone-using-Arduino-Leonardo-Beetle", © 2020 GitHub, Inc., 3 pps., <https://github.com/basic4/USB-Rubber-Ducky-Clone-using-Arduino-Leonardo-Beetle>.

"Will we ever fix 'broken' USB stick security?", Welivesecurity.com by ESET, May 20, 2016, <https://www.welivesecurity.com/2016/05/20/will-ever-fix-broken-usb-stick-security/>.

Brody, "USB Rubber Ducky Tutorial: The Missing Quickstart Guide to Running Your First Keystroke Payload Hack", Aug. 29, 2017, 15 pps., <https://blog.hartleybrody.com/rubber-ducky-guide/>.

Eaton, "Building a USB Rubber Ducky for $7", Medium, Aug. 7, 2017, 9 pps., <https://medium.com/@EatonChips/building-a-usb-rubber-ducky-for-7-c851aae30a1d>.

Greenberg, "Why the Security of USB Is Fundamentally Broken", Jul. 31, 2014, Wired, 5 pps., <https://www.wired.com/2014/07/usb-security/>.

Ingersoll, "The Biggest Threat To National Security Is The Thumb Drive", Jul. 24, 2013, 3 pps., <https://www.businessinsider.com/the-biggest-threat-to-national-security-is-the-thumb-drive-2013-7>.

"Simplified Description of USB Device Enumeration", Technical Note TN_113, Future Technology Devices International Ltd., Document Reference No. FT_000180, Version 1.0, Issue Date: Oct. 28, 2009, 19 pps.

Zhukov, "Turning a Regular USB Flash Drive into a USB Rubber Ducky", printed from the Internet on Jun. 28, 2020, 22 pps., <https://hackmag.com/security/rubber-ducky/>.

\* cited by examiner

| HID Class | Device Examples | Challenge Type | Action(s) associated with a Challenge |
|---|---|---|---|
| 00h | Unspecified device class. Interface descriptors utilized to determine required drivers | None | Always Disable |
| 01h | Speakers, Microphone, Sound Card | Audio | Respond to audio output by device. Input dictated audio element to the USB device |
| 02h | Ethernet, modem, serial port adapters | Action | Disconnect/connect device, detect a specified physical action |
| 03h | Keyboard, mouse, joystick | Captcha | Respond to challenge via a different Trusted HID device |
| 05h | Force feedback joystick | Action | Input requested button sequence |
| 06h | Digital camera – download digital images | Biometric | Disconnect/connect device |
| 07h | Laser Printer, Inkjet printer, etc. | Action | Turn printer Off/On, press indicated key |
| 08h | USB flash drive, memory card reader, digital audio player, external drive | Action | Disconnect/Connect device |
| 09h | Full speed USB hub, high-speed USB hub | Action | Disconnect/Connect device, Connect a Trusted USB device |
| 0Ah | CDC-Data (used with 02h: Communication & CDC control) | | See: HDI Class 02h |
| 0Bh | USB smart card reader | Action | Disconnect/Connect Device, Card |
| 0Eh | Webcam | Physical | Capture requested action via webcam |
| E0h | Wireless adapter, Wi-Fi™ adapter, Bluetooth™ adapter | Action | Disconnect/Connect device, Connect another device or network |
| EFH | ActiveSync and Palm sync device | Remote | Provide token on device |

FIG. 2

PROTECTING A SYSTEM FROM ATTACK VIA A DEVICE ATTACHED TO A USB PORT

BACKGROUND OF THE INVENTION

The present invention relates generally to the field of computer security, and more particularly to addressing susceptibilities of computing devices to malicious USB devices.

Universal serial bus (USB) technology and devices are ubiquitous across various technologies including computing infrastructures, network systems, personal computing devices, and various consumer electronics, such as smart-TVs. USB technology is utilized for a plurality of applications, such as storage devices for data back-up; provide communications interfaces between devices; security and/or identification resources, such as dongles that include credentials, encryption keys, or software license ID; provide boot or repairs for an operating system; recharge or share electrical power; linking entertainment devices; etc.

USB technologies include various connection types and support a plurality of device types. In response to connecting a USB device to another computing system or electronic device descriptor information is passed that enables the other system or device to determine type of USB device that is connected and some basic information about the device including: an interface class, a device class, a sub-class, a protocol, a manufacture ID, a product ID, USB compliance specification number, configurations, etc. One common set of USB devices are human interface devices (HIDs) that enable a computing system or electronic device with one or more embedded computing elements to receive input from a human and provide output to a human. Examples of HIDs include keyboards, pointing devices, webcams, fingerprint scanners, braille interfaces, graphics tables, joysticks, etc. Some USB devices can auto-activate or boot when connected to a USB port without further intervention from a user.

SUMMARY

According to an aspect of the present invention, there is a method, computer program product, and/or system for protecting a system from a malicious USB device. In an embodiment the method includes at least one computer processor interrupting a universal serial bus (USB) enumeration process corresponding to a first USB device operatively couple to a system. The method further includes at least one computer processor determining whether the first USB device is a human interface device (HID) based on a set of descriptor values corresponding to the first USB device. The method further includes at least one computer processor responding to determining that that first USB device is a HID by generating a validation challenge. The method further includes at least one computer processor presenting the validation challenge to a user of the system. The method further includes at least one computer processor responding to determining that the user fulfils one or more actions of the validation challenge by resuming the USB enumeration process corresponding to the first USB device

BRIEF DESCRIPTION OF THE DRAWINGS

FIG. 2 depicts an example of a challenge chart based on human interface device (HID) class, in accordance with an embodiment of the present invention.

DETAILED DESCRIPTION

Figure 1:
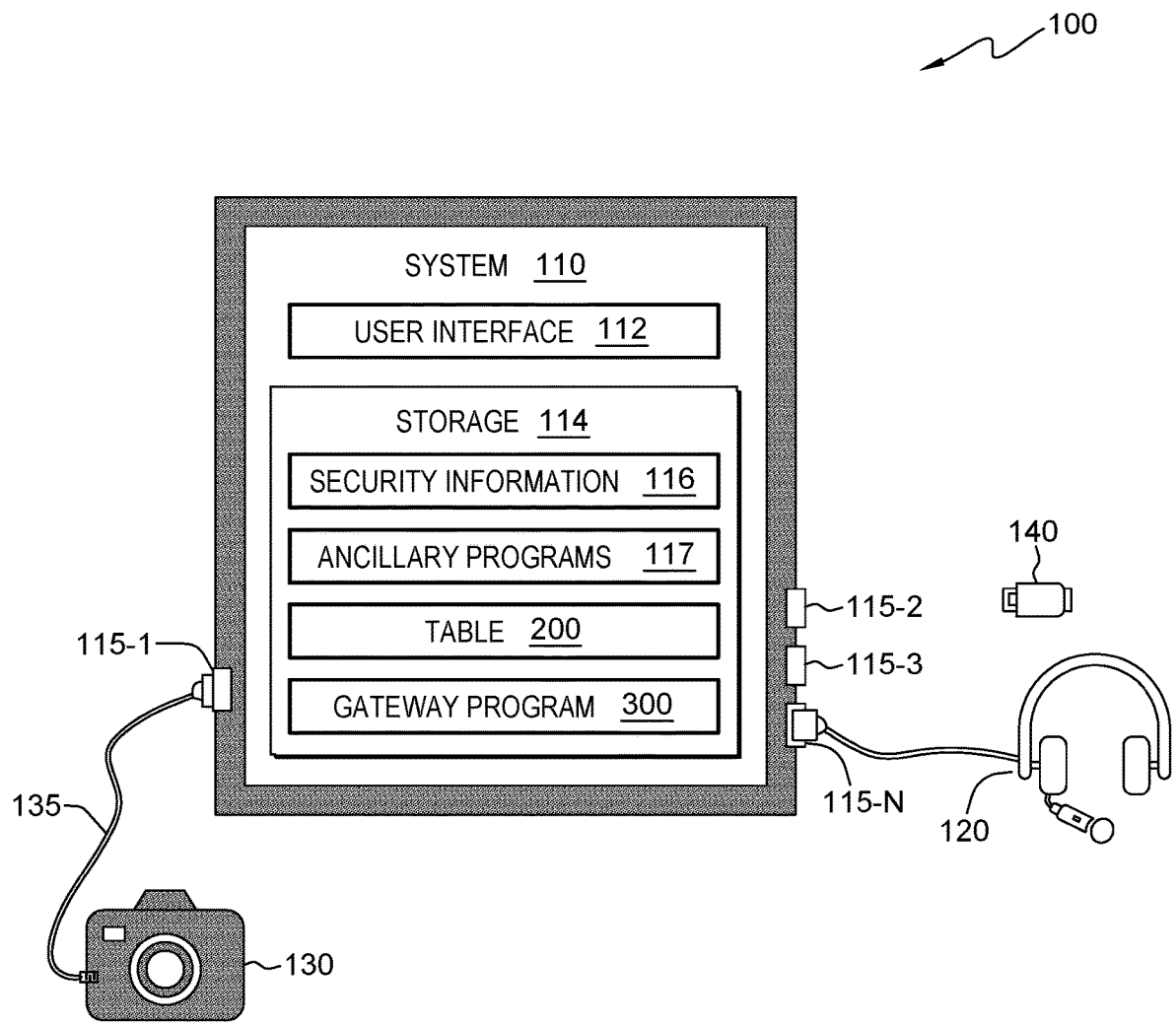
FIG. 1 illustrates a computing environment, in accordance with an embodiment of the present invention.

Embodiments of the present invention recognize that universal serial bus (USB™) peripherals and other human interface devices (HID) directly connected to a USB port of a computing system directly or connected via an intermediate USB device, such as a USB hub, docking station, or port replicator can be exploited by malicious actors to bypass various security measures installed on a computing device. Examples of USB HIDs include keyboards, monitors, printers, USB flash drives, speakers, augmented reality headsets, webcams, joysticks, etc. Enterprises and some users may be able to secure USB ports from specific output actions, such as saving files to an authorized device connected to a USB port.

However, embodiments of the present invention recognize that preventing receipt of commands and data from an unauthorized USB device or via a USB connection is a problem different from transmitting and saving data to a USB device. For example, if a USB port is utilized for charging a computing device, then utilizing a cable without active data lines or attaching another USB intermediate device series with a USB cable and the USB port disables the data/communication connections. However, embodiments of the present invention also recognize that this strategy is ineffective when USB ports are utilized for HIDs, thus enabling a malicious actor to spoof the nature of a USB device and potentially gain direct access to various aspects of a computing device.

Embodiments of the present invention address vulnerabilities related to the USB HID class. Some USB HIDs can automatically activate or self-boot when connected to a USB port, thereby allowing the USB device to deliver a malicious payload directly to the system and/or execute more complex tasks without knowledge of a user. For example, most devices from a smartphone to a desktop computer accept keyboard activity whether or not the keyboard activity was input by a human. The ubiquitous USB HID standard makes this possible. One example of a malicious USB device is a "Rubber Ducky" device, which is a keystroke injection tool that can be disguised as a generic USB flash drive. A computing system recognizes the USB Rubber Ducky device as a regular keyboard. In response, a modern operating system accepts the pre-programmed keystrokes input by the device. Thereby, enabling the Rubber Ducky device to inject pre-programmed keystroke payloads at over 1000 words per minute into the computing system. Many hardware and software platforms are at risk from this type of USB device. Seconds of physical access enables the deployment of some of the most advanced penetration attacks and compromises of hardware and security.

Embodiments of the present invention control access to a USB bus of a computing system or an electronic device that includes computing or computer-like functions and interrupt the USB enumeration process until the USB device is determined to not pose a security risk (e.g., is safe) to the computing system or electronic device. Therefore, embodiments of the present invention can protect an electronic device independent of the USB standard, specification, and/or protocol utilized by the electronic device because detection and identification a USB device occurs based on the enumeration protocol. Embodiments of the present invention utilize descriptor information received from an attached or activated USB device to determine the type/interface class of the USB device. Embodiments of the present invention allow non-HID USB devices to be enumerated and configured for use by the operating system (OS) of the computing system or electronic device without further testing (e.g., challenges, verifications).

In response to detecting a HID-type USB device, other embodiments of the present invention generate a random validation challenge that dictates one or more actions and/or responses to issue to a user of the computing system or electronic device. In some scenarios, embodiments of the present invention incorporate other USB HIDs associated with the computing system or electronic device as part of a validation challenge for testing a detected HID USB device. Embodiments of the present invention utilize challenges based on random action and random temporal dictates, such as response rates or windows of time when a response is identified as "valid" to determine whether a validation challenge is successfully completed. By utilizing randomized validation challenges, embodiments of the present invention prevent an unverified (i.e., suspect) USB HID from spoofing, copying, or anticipating a response to a validation challenge by monitoring and storing responses to prior validation challenges or challenges directed to other USB HIDs.

Some embodiments of the present invention can utilize a set of novel extensions to the Human Interface Class, apply a default HID class for all USB ports, and execute one or more validation challenges or multi-factor authentications methods in response to connecting a USB device to a computing device. Thus, embodiments of the present invention can prevent attacks from being deployed from USB malicious devices, such as the USB Rubber Ducky device while maintaining the viability of USB ports on modern machines and computing devices.

Further embodiments of the present invention can be included within the firmware or BIOS (basic input/output system) of a computing system to prevent a malicious USB device from deploying attacks during the power-up or boot of the computing system. Validation challenges can be presented to a user via an output device connected to the computing system as a feature of a BIOS screen.

The descriptions of the various scenarios, instances, and examples related to the present invention have been presented for purposes of illustration but are not intended to be exhaustive or limited to the embodiments disclosed.

The present invention will now be described in detail with reference to the Figures. FIG. 1 is a functional block diagram illustrating environment 100, in accordance with embodiments of the present invention. In an embodiment, environment 100 includes system 110, device 120, device 130, USB interface cable 135, and USB device 140.

System 110 may be a laptop computer, a tablet computer, a netbook computer, a personal computer, a desktop computer, a personal digital assistants (PDA), a smart phone, a wearable device (e.g., smart glasses, a smart watch, an e-textile, an AR headsets, etc.), or any programmable computer systems known in the art. In an embodiment, other instances of system 110 include other electronic devices of a user, such as a medical device, a fitness device, a music player, an entertainment console, etc. In certain embodiments, system 110 represents a computer system utilizing clustered computers and components (e.g., database server computers, application server computers, storage area networks, etc.) that act as a single pool of seamless resources, as is common in data centers and with cloud-computing applications. In other embodiments, system 110 represents other electronic devices that can include USB ports, such as a router, a network switches, a smart-TV, other consumer electronics, etc.

In general, system 110 is representative of any programmable electronic device or combination of programmable electronic devices capable of executing machine readable program instructions and communicating with another device via a USB interface. System 110 may include components, as depicted and described in further detail with respect to FIG. 4, in accordance with embodiments of the present invention.

System 110 includes user interface 112, storage 114, and a plurality of USB ports represented by USB port 115-1, USB port 115-2, USB port 115-3, and USB port 115-N. The number of USB ports may vary based on the nature of system 110. For example, an instance of system 110 that is a smartphone may include one micro-USB port; whereas a tower computer may include eight USB ports. In various embodiments, the USB standard (i.e., specification) and/or form factor of a USB ports of system 110 can vary while operating in accordance with embodiments of the present invention. For example, USB port 115-1 can be a USB 2.0 micro-B type USB port, USB port 115-2 can be a USB 1.1 type-A USB port, and USB port 115-N can be a USB 3.0 type-A port operating in compatibility mode. Further embodiments of the present invention can protect system 110 from USB HIDs attached to USB ports based on other USB specifications. System 110 may also include other interface connections (not shown), such as an audio output jack, an Ethernet port, a graphics port, a non-USB keyboard and mouse connections, a fiber optic port, etc.

In one embodiment, user interface 112 represents a component of system 110 that acts as an input device and an output device, such as a touch screen. In another embodiment, user interface 112 represents two or more components or peripherals associated with system 110 that a user of system 110 utilizes to receive information related to a validation challenge for a USB HID, and in some instances utilizes to input one or more actions of a USB HID validation challenge generated by gateway program 300. In one example, user interface 112 represents an embedded display, a touchpad, and keyboard of a laptop computer. In another example, user interface 112 represents a monitor and a P/S-2 keyboard.

Storage 114 includes security information 116, ancillary programs 117, one or more instance of table 200, gateway program 300 and other programs and data (not shown) related to system 110. For example, storage 114 may include other programs and data, such as an operating system (OS), a productivity suite, a calendar function, a wireless communication program, a web browser, a contact list, documents, etc. In some embodiments, storage 114 represents mass storage associated with system 110.

Security information 116 includes a plurality of information, rules, dictates, constraints, and/or user preferences related to system 110, and associated with one or more aspects of gateway program 300. In one embodiment, security information 116 includes a list of "trusted" USB HIDs utilized by system 110. In various embodiments, some aspects of security information 116 are respectively associated with various fields of an instance of table 200. In one example, based on the USB HIDs connected to system 110, security information 116 may include a hierarchy of devices that are selected in response to generating a validation challenge associated with a USB HID. In another example, based on the USB HIDs connected to system 110, security information 116 includes ranges of durations and tolerances that are used to generate random temporal windows related to determining whether a user action passes an aspect of a USB HID validation challenge. In yet another example, security information 116 may dictate various actions and temporal windows for non-USB HID validation challenges, such as one or more keystrokes or buttons must be depressed after at least 2 seconds but before 10 seconds have elapsed after the description of one element of the validation challenge appears on user interface 112.

Rules included within security information 116 may identify a number of elements to include in a validation challenge, include a reset delay duration related to gateway program 300 generating a subsequent validation challenge for a USB port that includes a USB HID that is associated with a failed validation challenge, generate a validation challenge that does not include a USB HID in response to determining that a trusted USB HID is not connected to system 110, etc. Other rules within security information 116 can dictate that gateway program 300 continues to monitor one or more USB devices of system 110 while system 110 operates. In one example, security information 116 may dictate that all USB devices operatively coupled to system 110 are monitored while system 110 operates. In another example, security information 116 may dictate that USB devices identified as HIDs are monitored for descriptor changes. In some embodiments, security information 116 includes information and dictates related to a duration or temporal delay for a block (e.g., deactivates data channels) on a USB port that gateway program 300 maintains in response to a failed USB HID validation challenge.

Ancillary programs 117 includes a suite of programs that gateway program 300 can utilize to generate some aspects of a validation challenge associated with a HID, and to detect and analyze user action (e.g., responses) to a HID validation challenge. For example, one or more programs of ancillary programs 117 can generate graphical user interfaces and/or graphical elements related to a HID validation challenge generate by gateway program 300, such as a text description of a validation challenge, a countdown timer, highlighted graphical elements, etc. Ancillary programs 117 may include a text-to-speech program, a speech-to text program, dictionary program, a thesaurus, a question and answer program, a key or function mapping program that can determine the elements included within a USB HID, an image recognition program, a stopwatch or timer program, a graphics program, a sound/music generation program, an audio recognition program, etc. In various embodiments, ancillary programs 117 also include a system monitoring program, system management functions, visual and/or audio validation challenge generation programs, such as a CAPTCHA or ReCAPTCHA program.

Table 200 represents one or more tables that include one or more elements respectively associated with a HID class value of a list of HID class values (i.e., base classes) and further associated with at least one type of validation challenge for an USB HID and a corresponding set of actions related to the HID validation challenge. In an embodiment, the number of fields of information corresponding to a HID class value can vary. An example of information stored among fields of an instance of table 200 is described in further detail with respect to FIG. 2. In various embodiments, gateway program 300 utilizes elements of table 200 and items within security information 116 to generate a validation challenge associated with a USB HID cooperatively couple to system 110. In some embodiments, fields within an instance of table 200 can be linked, cross-referenced, and/or respectively associated with other tables and/or information within security information 116.

Gateway program 300 is a program that protects a computing system or electronic device that includes one or more USB ports from attacks initiated by a malicious device that detects as a USB HID. Some aspects of gateway program 300 can be implemented within firmware of the computing system or the electronic device. In one embodiment, gateway program 300 interrupts (e.g., suspends) the normal USB enumeration process. In one scenario, gateway program 300 controls and monitors USB bus and/or an attached USB hub to identify (e.g., detect) USB devices that are operatively coupled to a computing system or electronic device at startup of the computing system or electronic device. In another scenario, gateway program 300 controls and monitors USB bus and/or a USB hub or to identify (e.g., detect) USB devices that are operatively coupled to a computing system or electronic device during the OS load of the computing system or electronic device, such as device 120 of system 110. In another embodiment, gateway program 300 controls and monitors a USB hub or USB bus to identify USB devices that activate or are connected to a USB port post-OS load of system 110, such as connecting to a USB device 140 to port 115-2 of system 110.

In some embodiments, gateway program 300 determines information related to a computing system or an electronic device to determine whether other USB devices are operatively coupled to the computing system or electronic device and to further determine whether one or more of the identified USB devices are identified as a "trusted" HID. In various embodiments, if gateway program 300 determines that a detected USB device is a HID, then gateway program 300 generates a random validation challenge that includes one or more actions or responses that are performed by a user of system 110. Gateway program 300 further associates a temporal window with each action/response of the USB HID validation challenge. If an action or response occurs within the dictated temporal window, then gateway program 300 accepts that action or response as a "pass" for that portion of the generated validation challenge. If one or more portions of a validation challenge fail, then gateway program 300 blocks or deactivates a USB port corresponding to the validation challenged USB HID and terminates the USB enumeration process related to the USB port corresponding to the failed USB HID validation challenge.

In a further embodiment, gateway program 300 can monitor system 110 and determine whether any active USB devices present changed descriptor information. If gateway program 300 detects a change to USB descriptor information, more specifically a USB HID, then gateway program 300 suspends other communications via the USB port corresponding to the USB device that presents changed descriptor information. For example, if gateway program 300 originally enumerated (e.g., detected) a USB HID as a flash memory device (e.g., HID=class 08h), but the USB HID in the same USB port later detects as a keyboard (e.g., HID class=03h, protocol=01h), then gateway program 300 detects the descriptor changes. In response, gateway program 300 suspends communications with the affect USB port and device until generating another validation challenge. In addition, gateway program 300 warns the user of system 110 of the detected change and a corresponding type of USB HID that the USB device is currently representing.

Figure 4:
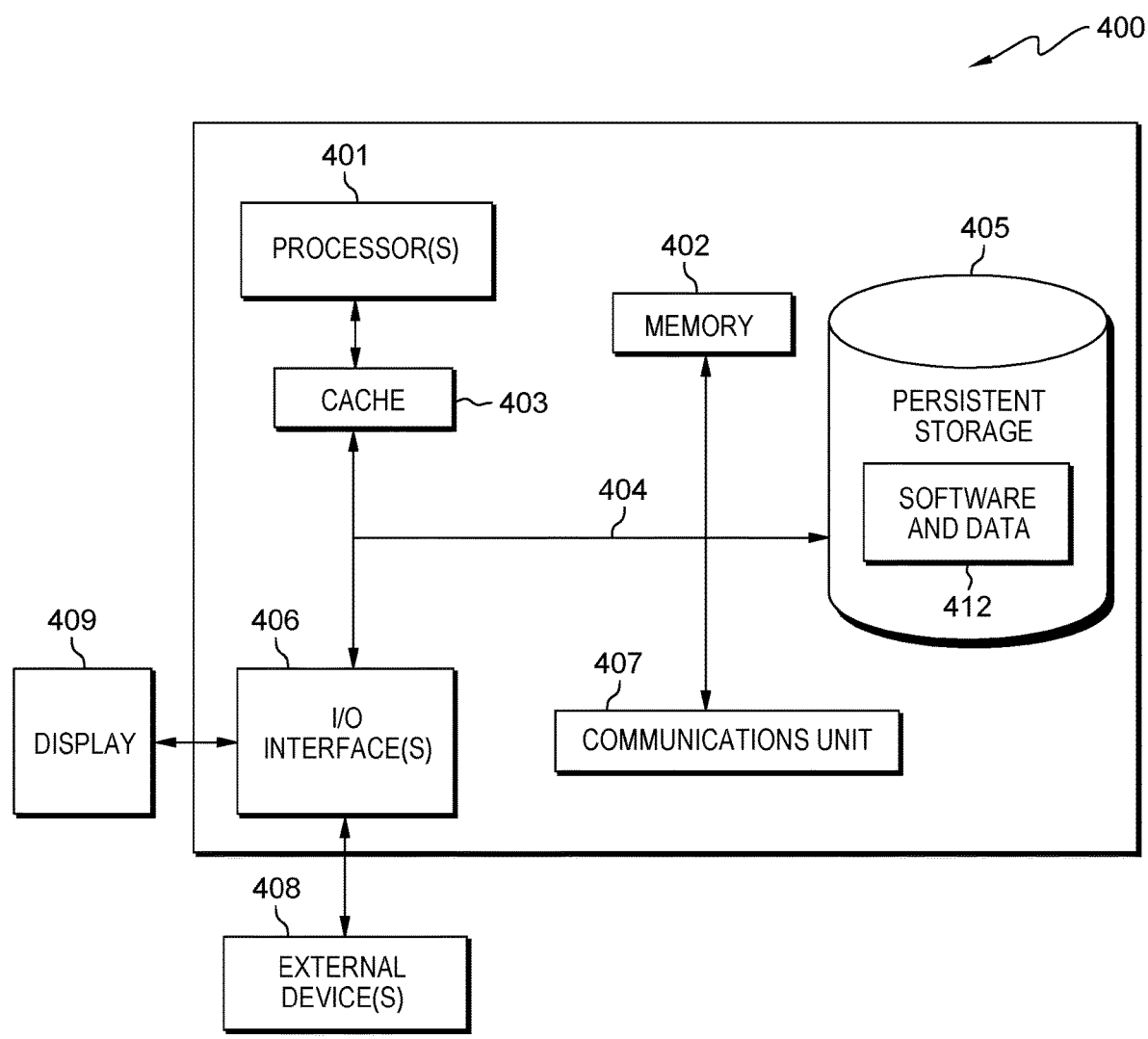
FIG. 4 is a block diagram of components of a computer, in accordance with an embodiment of the present invention.

In an embodiment, one or more of device 120, device 130, and USB device 140 can include one or more components, as depicted and described in further detail with respect to FIG. 4, in accordance with embodiments of the present invention.

Device 120 is representative of a USB HID directly connected to system 110 via USB port 115-N. In a depicted example embodiment of environment 100, USB device 120 is a USB headset (e.g., HID class=01h) that includes earphones and a microphone. In some scenarios, device 120 is an unpowered USB device that activates in response to being connected to a USB port while system 110 is powered-on. In other scenarios, device 120 is connected to system 110 prior to powering-up system 110. In some embodiments, device 120 is identified as a trusted USB device within security information 116.

In the illustrative example of environment 100, device 130 is representative of a consumer electronic device, such as a digital camera (e.g., HID class=06h) that includes a USB port utilized for downloading stored images or videos to a computing system, such as system 110. In an embodiment, device 130 requires USB cable 135 to interface with system 110 via a USB port (e.g., USB port 115-1).

In an embodiment, USB device 140 is a non-powered USB device with characteristics and descriptors unknown to system 110 prior to insertion in a USB port of system 110, such as USB port 115-2. In another embodiment, USB device 140 is a self-powered USB device with characteristics and descriptors unknown to system 110. In some scenarios USB device 140 is a malicious USB device that attempt to deliver a payload to system 110 upon connection to system 110. In other scenarios, USB device 140 is a stealth USB device that upon connection and activation in association with system 110 detects and operates as one type of USB HID. However, at some time in the future while connected to system 110, USB device 140 activates different functionalities and changes USB characteristics (e.g., resets and provides differing USB descriptors) in an attempt to deliver a malicious payload to system 110.

FIG. 2 is a non-limiting example of table 200 that associates HID classes to an USB HID validation challenge type and one or more actions utilized to respond to a HID validation challenge. In the depicted embodiment table 200 includes four columns of information: columns 201, 202, 203, and 204. In one embodiment, column 201 stores USB HID class values, column 202 includes one or more examples of hardware associated with a HID class value, column 203 indicates a validation challenge type utilized to test a USB HID device, and column 204 indicates one or more actions performed by a user to verify a USB HID device (e.g., pass a challenge). For example, row 210 indicates that the USB HID class (i.e., base class) value corresponding to a keyboard, mouse, or joystick is 03h. In various instances, the USB HID class of 03h is often associated with malicious USB devices.

Column 203 includes a non-limiting list of example validation challenge types for a USB HID. An audio challenge may indicate that a sound, word, or descriptive sound challenge described within user interface 112 is input to a USB device that includes a microphone, such as depicted device 120. Alternatively, trusted audio HID (headphones) can present a challenge generated by gateway program 300 and a user responds via the same device, another device, or via user interface 112. An action challenge includes disconnecting and reconnecting a trusted USB device to the same USB port, a port of a USB hub, or a different USB port if gateway program 300 determines that an unused USB port is available, such as USB port 115-3. A CAPTCHA challenge may refer to a graphical challenge depicted presented via user interface 112 and responded to via a trusted USB device, such as a keyboard. A physical challenge may include utilizing a USB HID to receive a type of input specific to the USB HID, such as detecting a described orientation change, detecting a dictated device function activation, etc.

In some embodiments, a field within a column of table 200 can include a hierarchy of information or elements, such as column 203 (i.e., Challenge Type). In one example, if gateway program 300 generates a validation challenge for a webcam (HID class=0Eh) and ancillary programs 117 lacks an image recognition program, then actions related to the webcam may be constrained to blocking light from the webcam or shining a bright light at the webcam for a period of time corresponding to a temporal window. Alternatively, if ancillary programs 117 includes an image recognition program, then an action related to the webcam may be to present an object of a dictated color or shape to the webcam during the dictated temporal window. Similarly, information included within column 204 may include a list of actions that gateway program 300 may select among based on constraints and/or dictated related to system 110.

In various embodiments, gateway program 300 combines information within an instance of table 200 with dictates and/or constraints within security information 116 to generate random validation challenges and one or more actions respectively dictated to pass the validation challenge. In some embodiments, table 200 includes additional columns (i.e., fields) that store other USB descriptor information, such as a device sub-class value and/or a protocol value. For example, if table 200 includes additional USB descriptor fields, then columns 203 and 204 may include validation challenge types and/or actions respectively associated with the additional USB descriptor information. In some embodiments, columns 203 and 204 of table 200 represent validation challenge types and action(s) applied to a known USB HID device operatively coupled to system 110 in response to gateway program 300 detecting an unknown USB device. In other embodiment, columns 203 and 204 of table 200 represent validation challenge types and action(s) applied to a USB HID device that is being verified base on a validation challenge generated by gateway program 300.

Figure 3:
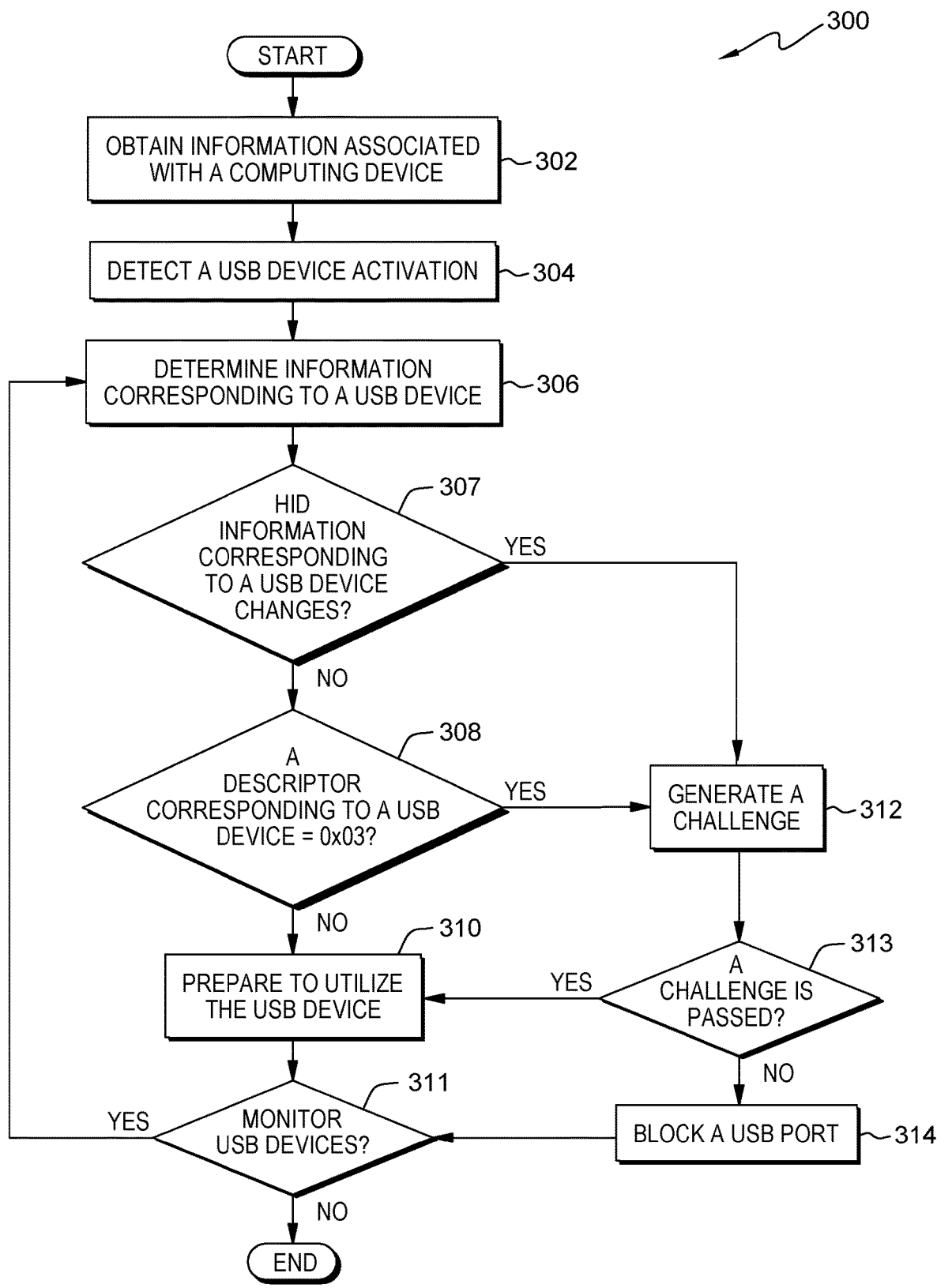
FIG. 3 depicts a flowchart of steps of a USB gateway program, in accordance with an embodiment of the present invention.

FIG. 3 is a flowchart depicting operational steps for gateway program 300, a program for securing and monitoring USB ports of a computing system or electronic device, in accordance with embodiments of the present invention. In various embodiments, gateway program 300 activates during the boot sequence of an OS of a system/device to interrupt the USB enumeration process, of attached USB devices, such as loading USB drivers, assigning addresses to USB ports, and configuring the attached USB devices. In some embodiments, gateway program continues executing in the background of a system/device to protect the system/device from a malicious USB HID that is connected to a USB port of the system/device post-boot and/or OS load; or activates later during the operation of the system/device.

In step 302, gateway program 300 obtains information associated with a computing device. In one embodiment, gateway program 300 utilizes one or more features of an OS of system 110 to obtain information related to a number and type of USB ports included within system 110. The obtained information may also include IDs and/or addresses corresponding to a USB port of system 110. In another embodiment, gateway program 300 utilizes another function or program installed within system 110 to determine a number and type of USB ports included within system 110. In some embodiments, gateway program 300 obtains information associated with system 110 related to USB devices that have been verified and are listed as "trusted" devices within security information 116.

In various embodiments, gateway program 300 also determines other information associated with other aspects of system 110 that are not USB attached devices but are utilized for various user communications and/or interactions, such as an embedded display or one or more displays attached to a graphics card, a keyboard, a touch-screen, an embedded speaker, a headset connect to an audio port, etc. In a further embodiment, gateway program 300 utilizes a set of novel extensions to the Human Interface Class and applies a default HID class to all USB ports of system 110, such as USB ports 115-1, 115-2, 115-3 through 115-N prior to activating or connecting a USB device to system 110.

In step 304, gateway program 300 detects a USB device activation. In some scenarios, with respect to some USB standards/specifications (e.g., USB 1.1, USB 2.0, and a USB compatibility mode), gateway program 300 detects a USB device activation based on determining that the Data+ and/or Data− channels of a USB port have a voltage present, such as a voltage of +5 VDC. In other scenarios, gateway program 300 detects an activation of a USB device based on another standard/specification (e.g., USB 3.2, USB-C, etc.) by detecting a voltage or a signal at one or more other USB channels, such as CC1 (i.e., communication channel 1), CC2, a differential pair, etc.

In addition, in various embodiments gateway program 300 secures a portion of the USB bus and a corresponding USB port of system 110 until gateway program 300 determines that the USB device does not to pose a security threat (e.g., determined to be safe). Gateway program 300 blocks (e.g., interrupts) USB enumeration activity not associated with obtaining USB device descriptor information associated with a USB device operatively coupled to system 110. In one example, gateway program 300 blocks calls to assign an address to the USB device. In another example, gateway program 300 blocks the OS or device manager from performing a device reset, which can trigger a delivery of a payload from a malicious USB device.

Still referring to step 304, in some embodiments gateway program 300 detects a USB device activation as part of a boot sequence corresponding to system 110. In an example, a user of system 110 leaves USB headset (i.e., device 120) 120 continually connected to system 110. In response to powering on system 110, gateway program 300 detects the USB headset. In another embodiment, gateway program 300 detects a USB device activation based on a USB device being connected and/or inserted into a USB port of system 110. For example, gateway program 300 detects USB device 140 in response to a user plugging device 140 into USB port 115-2. In another example, gateway program 300 does not detect a digital camera (i.e., device 130) connected to USB port 115-1 via USB cable 135 until the digital camera is powered-on (i.e., activated). In other embodiments, gateway program 300 detects a USB device activation at a USB port external to system 110 (not shown), such as a USB port included within a USB hub or a port replicator.

In step 306, gateway program 300 determines information corresponding to a USB device. Information determined by gateway program 300 may be stored within security information 116. In one embodiment, gateway program 300 determines descriptor information (e.g., an initial set of descriptor values) corresponding to a USB device operatively coupled to system 110, such as a USB device plugged into a USB port of system 110 (e.g., port 115-N) or attached to a USB hub (not shown) connected to system 110. USB descriptor information may include values indicating: an interface class, a device class, a sub-class, and/or a protocol corresponding to a USB device. For example, an interface class value of 0x03 corresponds to HIDs; a device class value of 03h is associated with keyboards, mice, joysticks, etc.; a sub-class value of 01h is related to a boot interface; and a protocol value of 02h corresponds to a mouse device. Gateway program 300 may also identify other information include within the descriptor corresponding the USB device, such as a vendor ID, a product ID, a number of variants related to configuring the USB device, etc.

In another embodiment, gateway program 300 can lookup information within security information 116 to identify a trusted USB device of system 110. In other embodiments, responsive to determining to monitor USB devices of system 110 (Yes branch, decision step 311), gateway program 300 and/or a monitoring daemon can operate to determine a subsequent set of descriptor values that correspond to the monitored USB device. For example, gateway program 300 may receive other descriptor information (e.g., a subsequent set of descriptor values) in response to a USB device that re-initiates the enumeration process. If one or more subsequent descriptor values differ from an initial descriptor value corresponding to a USB device, then gateway program 300 flags the device for subsequent checks and responses, such as generating and issuing a new validation challenge (step 312).

In various embodiments, gateway program 300 also blocks or quarantines activity and/or communications of the USB port and/or USB address corresponding to the USB device that is associated with one or more descriptor value changes. In addition, gateway program 300 warns the user of system 110 of the detected change related to the HID and the type of USB HID that the USB device currently represents. Gateway program 300 may utilize user interface 112 and/or another feature/program of system 110 to warn the user of the USB HID change.

In decision step 307, gateway program 300 determines whether HID information corresponding to a USB device changes. In some embodiment, gateway program 300 skips determining whether the HID information changes in response to determining that the interface class of a USB device is a value different from 0x03 (i.e., is not a HID-type USB device) and utilizes the NO branch of decision step 307.

In other embodiments, gateway program 300 determines whether HID information corresponding to a USB device changes based on comparing the information corresponding to the USB device determined at device activation and stored within security information 116 to USB information determined while monitoring the USB devices operatively connect to system 110. In one example, gateway program 300 determines that the HID class of USB device 140 attached to USB port 115-2 originally detected USB device 140 as a flash drive (i.e., HID class=08h). However, subsequent monitoring by gateway program 300 of respective USB devices operatively coupled to system 110 determines that USB device 140 now detects as a keyboard (i.e., HID class=03h). In another example, gateway program 300 determines that HID information corresponding to USB device 140 changes based on determining that a device protocol value changes from 02h (e.g., a USB mouse) to 01h (e.g., a USB keyboard).

Responsive to determining that the HID information corresponding to a USB device does not change (No branch, decision step 307), gateway program 300 determines whether a descriptor corresponding to a USB device=0x03 (decision step 308).

In decision step 308, gateway program 300 determines whether a descriptor corresponding to a USB device=0x03. In an embodiment, gateway program 300 determines whether a descriptor value (e.g., interface class) corresponding to a USB device=0x03 by parsing and analyzing the USB device descriptor information (obtained in step 306). Responsive to determining that the descriptor corresponding to a USB device does not equal 0x03 (No branch, decision step 308), gateway program 300 prepares to utilize the USB device (step 310).

In step 310, gateway program 300 prepares to utilize the USB device. In one embodiment, gateway program 300 messages an OS of system 110 that a USB device is not a USB HID and gateway program 300 permits the USB enumeration process to configure the USB device to interface with system 110. In another embodiment, gateway program 300 messages an OS of system 110 that a USB HID passed a USB HID validation challenge (Yes branch, decision step 313). Gateway program 300 removes the hold imposed on the USB bus/USB port for the safe USB device and permits the USB enumeration process to configure the USB device to interface with system 110.

In decision step 311, gateway program 300 determines whether to monitor USB device. In one embodiment, gateway program 300 utilizes a rule or other information included within security information 116 to determine to monitor USB devices operatively coupled to system 110. In one example, gateway program 300 determines to monitor all USB devices operatively coupled to system 110. In another example, gateway program 300 determines to monitor USB HIDs. Responsive to determining to monitor USB devices (Yes branch, decision step 311), gateway program 300 loops to step 306 to step 306 to determine information corresponding to one or more USB devices operatively coupled to system 110.

Referring to decision step 308, responsive to determining that a descriptor corresponding to a USB device=0x03 (Yes branch, decision step 308), gateway program 300 generates a challenge (step 312).

In step 312, gateway program 300 generates a challenge. Gateway program 300 may tailor generating a USB HID validation challenge based on information and user preferences within security information 116, such as differing response time duration ranges (e.g., temporal window sized), a number of multi-factor elements to generate, features include within system 110, a list of trusted USB devices, etc. Gateway program 300 may generate a random validation challenge that includes repeated actions separated or differing by one or more temporal windows, such as disconnecting and reconnecting device 120 to USB port 115-N in response to differing visual cues. In one embodiment, gateway program 300 generates a random USB HID validation challenge utilizing one or more trusted USB devices (previously discussed with respect to FIG. 2) operatively connected to system 110. In various embodiments, gateway program 300 utilizes one or more other features or devices included in system 110, and/or connected to system 110 (determined in step 302) to communicate the USB HID validation challenge to a user of system 110.

In another embodiment, if gateway program 300 determines that system 110 is configured for a particular accessibility constraint, then gateway program 300 generates the random USB HID validation challenge and communicates with a user of system 110 based on the determined accessibility constraint. An accessibility constraint refers to a communication limitation related to the user of system 110 and/or system 110, such as utilizing an audio or tactile interface because the user of system 110 is visually impaired. Gateway program 300 can communicate other details related to the validation challenge, such as a sequence of events/actions, timing of an event/action, a temporal tolerance related to a response to a validation challenge action, etc. In some scenarios, gateway program 300 presents validation challenge information to a user of system 110 via one or more aspects of user interface 112.

In another scenario, if gateway program 300 determines that the location of system 110 constrains user input, such as driving a vehicle, then gateway program 300 can utilize one or more programs program of ancillary programs 117 to generate an audio description of a validation challenge. In addition, a program of ancillary programs 117 can generate tones and/or sound effects to indicate the timing associated with challenge and accept verbal/audio responses to aspects of the validation challenge. Gateway program 300 may also utilize another aspect of system 110 and/or a trusted interface different from user interface 112, such as device 120 (e.g., a USB headset) to communicate the USB HID validation challenge to the user of system 110.

Still referring to step 312, in a further embodiment if gateway program 300 determines that a suspect USB HID must be utilized for inputting a response to a validation challenge, then gateway program 300 can constrain the received input to a limited number of inputs in response to each event within a validation challenge. In addition, gateway program 300 can generate a tiny secure buffer to capture the limited responses for the unverified USB HID. For example, if a USB keyboard is being verified, then gateway program may dictate that a single key response is input during each event of a validation challenge, such as in response to visual time window, displayed characters change color but only one color correctly indicates the validation challenge response character, respond when system 110 vibrates, etc.

In decision step 313, gateway program 300 determines whether a challenge is passed. In one embodiment, if a user of system 110 correctly fulfils each action/response of a validation challenge within a dictated temporal window with a designated USB HID, then gateway program 300 determines that the validation challenge is passed. In some scenarios, decision step 313 waits to execute until all elements of a validation challenge are complete. In other scenarios, decision step 313 monitors each element of the validation challenge. In another embodiment, if a user of system 110 correctly fulfils each action/response of a validation challenge by within a dictated temporal window utilizing the unverified (i.e., suspect) USB HID, then gateway program 300 determines that the validation challenge is passed. In other embodiments, if the user of system 110 does not fulfil each action/response of a validation challenge by within a dictated temporal window a dictated temporal window, then gateway program 300 determines that the validation challenge is not passed (i.e., fails).

Responsive to determining that a challenge is passed (Yes branch, decision step 313), gateway program 300 prepares to utilize the USB device (step 310). Responsive to determining that a validation challenge is not passed (No branch, decision step 313), gateway program 300 blocks a USB port. (step 314).

In step 314, gateway program 300 blocks a USB port. In one embodiment, gateway program 300 blocks a USB port operatively coupled the USB HID that failed a validation challenge. Gateway program 300 aborts the USB enumeration (e.g., USB initialization) and blocks the USB port that includes the USB HID that failed the validation challenge. For example, if a user of system 110 fails a validation challenge corresponding to USB device 140 connected to port 115-2 of system 110, then gateway program 300 blocks further activity on USB port 115-2 while device 140 is connected to system 110. In some embodiments, gateway program 300 blocks and quarantines the active USB port that includes the USB device that failed the validation challenge.

In other embodiments, if gateway program 300 detects that USB port 115-2 does not have a USB device connected for and/or after a threshold period of time based on data within security information 116, then gateway program 300 unblocks access to 115-2. For example, gateway program 300 determines that port 115-2 does not have a USB device connected by determining that Data+ and/or Data− connections of USB port lack an applied voltage, such as +5 VDC. In various embodiments, after gateway program 300 blocks a USB port, or in response to gateway program 300 unblocking a USB port after a threshold period of time, gateway program 300 proceeds to decision step 311 to determine whether to monitor USB devices of system 110.

Referring to decision step 311, responsive to determining not to monitor USB devices associated with system 110 (No branch, decision step 311), gateway program 300 terminates.

FIG. 4 depicts computer system 400, which is representative of system 110. Computer system 400 is an example of a system that includes software and data 412. Computer system 400 includes processor(s) 401, cache 403, memory 402, persistent storage 405, communications unit 407, input/output (I/O) interface(s) 406, and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random-access memory (RAM). In general, memory 402 can include any suitable volatile or non-volatile computer readable storage media. Cache 403 is a fast memory that enhances the performance of processor(s) 401 by holding recently accessed data, and data near recently accessed data, from memory 402.

Program instructions and data used to practice embodiments of the present invention may be stored in persistent storage 405 and in memory 402 for execution by one or more of the respective processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information. In various embodiments, with respect to system 110, storage 405 includes storage 114.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405. Software and data 412 are stored in persistent storage 405 for access and/or execution by one or more of the respective processor(s) 401 via cache 403 and one or more memories of memory 402. With respect to system 110, software and data 412 includes security information 116, ancillary program 117, table 200, gateway program 300, and other programs and data (not shown).

Communications unit 407, in these examples, provides for communications with other data processing systems or devices. In these examples, communications unit 407 includes one or more network interface cards. Communications unit 407 may provide communications, through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. In an embodiment, USB ports 115-1, 115-2, 115-3 and 115-N of system 110 represent instances of I/O interface(s) 406. For example, I/O interface(s) 406 may provide a connection to external device(s) 408, such as a keyboard, a keypad, a touch screen, and/or some other suitable input device. External device(s) 408 can also include portable computer readable storage media, such as, for example, thumb drives, portable optical or magnetic disks, and memory cards. In an embodiments, device 120, device 130, and USB device 140 are also representative of external device(s) 408. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and may be, for example, a computer monitor. In an embodiment, one or more aspects of user interface 112 can include an instance of display 409. Display 409 can also function as a touch screen, such as the display of a tablet computer or a smartphone. Alternatively, display 409 displays information to a user based on a projection technology, such as virtual retinal display, a virtual display, or image projector.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random-access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   determining, by one or more computer processors, that a first universal serial bus (USB) device is connected to a port of a system;
   interrupting, by one or more computer processors, a universal serial bus (USB) enumeration process in response to a determination that the first USB device is connected to the port of the system;

determining, by one or more computer processors, whether the first USB device is a human interface device (HID) based on a set of descriptor values corresponding to the first USB device;

responsive to determining that that first USB device is a HID, generating, by one or more computer processors, a validation challenge, wherein the validation challenge includes at least one of highlighted graphical elements, a text-to-speech program, a speech-to text program, dictionary program, a thesaurus, a question and answer program, a key or function mapping program that can determine the elements included within a USB HID, an image recognition program, a stopwatch or timer program, a graphics program, a sound/music generation program and an audio recognition program;

presenting, by one or more computer processors, the validation challenge to a user of the system; and responsive to determining that the user fulfils one or more actions of the validation challenge, resuming, by one or more computer processors, the USB enumeration process corresponding to the first USB device, wherein the interrupting the USB enumeration process comprises blocking instructions to assign an address to the first USB device in response to the determination that the first USB device is connected to the port of the system.

2. The method of claim 1, further comprising:

determining, by one or more computer processors, information related to the system, wherein information related to the system includes a list of one or more trusted HIDs operatively coupled to respective USB ports of the system, and wherein a first descriptor is respectively associated with a trusted HID indicates a HID class corresponding to the trusted HID.

3. The method of claim 1, wherein determining whether the first USB device is a HID based on the set of descriptor values corresponding to the first USB device further comprises:

determining, by one or more computer processors, whether a value of a second descriptor of set of descriptor values corresponding to the first USB device is equal to a value of 0x03; and responsive to determining that the value of the second descriptor value of the set of descriptor values corresponding the first USB device is equal to the value of 0x03, flagging, by one or more computer processors, the first USB device as the HID.

4. The method of claim 3, further comprising:

responsive to determining that the value of the second descriptor is different from the value of 0x03, resuming, by one or more computer processors, the USB enumeration process corresponding to the first USB device.

5. The method of claim 1, wherein generating the validation challenge further comprises:

determining, by one or more computer processors, whether the system includes a trusted HID;

responsive to determining that the system includes the trusted HID, generating, by one or more computer processors, the validation challenge based on one or more random actions related to the trusted HID and random temporal windows during which a respective random action of the one or more random actions is performed by a user of the system; and responsive to determining that each of the one or more random actions is performed by the user within the respective random temporal window, determining, by one or more computer processors, that the validation challenge is passed.

6. The method of claim 1, further comprising:

determining, by one or more computer processors, initial sets of USB descriptor values respectively associated with one or more USB devices operatively couple to the system that are further identified as HIDs.

7. The method of claim 6, further comprising:

monitoring, by one or more computer processors, a USB device operatively coupled to the system while the system operates, wherein monitoring includes determining a subsequent set of USB descriptor values respectively associated with the monitored USB device;

determining, by one or more computer processors, that one or more descriptor values corresponding to the subsequent set of USB descriptor values for the monitored USB device differs from the initial set of USB descriptor values respectively associated with the monitored USB device; and blocking, by one or more computer processors, a USB port corresponding to the monitored USB device associated with the subsequent set of USB descriptors that differ.

8. A computer program product comprising:

one or more computer readable storage media and program instructions stored on the one or more computer readable storage media, the program instructions readable/executable by one or more computer processors:

program instructions to determine that a first universal serial bus (USB) device is connected to a port of a system;

program instructions to interrupt a universal serial bus (USB) enumeration process in response to a determination that the first USB device is connected to the port of the system;

program instructions to determine whether the first USB device is a human interface device (HID) based on a set of descriptor values corresponding to the first USB device;

responsive to determining that that first USB device is a HID, program instructions to generate a validation challenge, wherein the validation challenge includes at least one of highlighted graphical elements, a text-to-speech program, a speech-to text program, dictionary program, a thesaurus, a question and answer program, a key or function mapping program that can determine the elements included within a USB HID, an image recognition program, a stopwatch or timer program, a graphics program, a sound/music generation program and an audio recognition program;

program instructions to present the validation challenge to a user of the system;

program instructions to block an active USB port that includes the first USB device that failed the validation challenge; and responsive to determining that the user fulfils one or more actions of the validation challenge, program instructions to resume the USB enumeration process corresponding to the first USB device, wherein the program instructions to interrupt the USB enumeration process comprise program instructions to block instructions to assign an address to the first USB device in response to the determination that the first USB device is connected to the port of the system.

9. The computer program product of claim 8, further comprising:
program instruction to determine information related to the system, wherein information related to the system includes a list of one or more trusted HIDs operatively coupled to respective USB ports of the system, and wherein a first descriptor is respectively associated with a trusted HID indicates a HID class corresponding to the trusted HID.

10. The computer program product of claim 8, wherein program instructions to
determine whether the first USB device is a HID further comprise:
program instructions to determine whether a value of a second descriptor of set of descriptor values corresponding to the first USB device is equal to a value of 0x03; and
responsive to determining that the value of the second descriptor value of the set of descriptor values corresponding the first USB device is equal to the value of 0x03, program instructions to flag the first USB device as the HID.

11. The computer program product of claim 10, further comprising:
responsive to determining that the value of the second descriptor is different from the value of 0x03, program instructions to resume the USB enumeration process corresponding to the first USB device.

12. The computer program product of claim 8, wherein program instructions to generate the validation challenge further comprise:
program instructions to determine whether the system includes a trusted HID;
responsive to determining that the system includes the trusted HID, program instructions to generate the validation challenge based on one or more random actions related to the trusted HID and random temporal windows during which a respective random action of the one or more random actions is performed by a user of the system; and
responsive to determining that each of the one or more random actions is performed by the user within the respective random temporal window, program instruction to determine that the validation challenge is passed.

13. The computer program product of claim 8, further comprising:
program instructions to determine initial sets of USB descriptor values respectively associated with one or more USB devices operatively couple to the system that are further identified as HIDs.

14. The computer program product of claim 13, further comprising:
program instructions to monitor a USB device operatively coupled to the system while the system operates, wherein monitoring includes program instruction to determining a subsequent set of USB descriptor values respectively associated with the monitored USB device;
program instructions to determine that one or more descriptor values corresponding to the subsequent set of USB descriptor values for the monitored USB device differs from the initial set of USB descriptor values respectively associated with the monitored USB device; and
program instructions to block a USB port corresponding to the monitored USB device associated with the subsequent set of USB descriptors that differ.

15. A computer system comprising:
one or more computer processors;
one or more computer readable storage media; and
program instructions stored on the computer readable storage media for execution by at least one of the one or more computer processors, the program instructions comprising:
program instructions to determine that a first universal serial bus (USB) device is connected to a port of a system;
program instructions to interrupt a universal serial bus (USB) enumeration process in response to a determination that the first USB device is connected to the port of the system;
program instructions to determine whether the first USB device is a human interface device (HID) based on a set of descriptor values corresponding to the first USB device;
responsive to determining that that first USB device is a HID, program instructions to generate a validation challenge, wherein the validation challenge includes at least one of highlighted graphical elements, a text-to-speech program, a speech-to text program, dictionary program, a thesaurus, a question and answer program, a key or function mapping program that can determine the elements included within a USB HID, an image recognition program, a stopwatch or timer program, a graphics program, a sound/music generation program and an audio recognition program;
program instructions to generate another validation challenge in response to determining that the first USB device has descriptor changes;
program instructions to present the validation challenge to a user of the system; and
responsive to determining that the user fulfils one or more actions of the validation challenge, program instructions to resume the USB enumeration process corresponding to the first USB device,
wherein the interrupting the USB enumeration process comprises blocking instructions to assign an address to the first USB device in response to the determination that the first USB device is connected to the port of the system.

16. The computer system of claim 15, further comprising:
program instruction to determine information related to the system, wherein information related to the system includes a list of one or more trusted HIDs operatively coupled to respective USB ports of the system, and wherein a first descriptor is respectively associated with a trusted HID indicates a HID class corresponding to the trusted HID.

17. The computer system of claim 15, wherein program instructions to determine whether the first USB device is a HID further comprise:
program instructions to determine whether a value of a second descriptor of set of descriptor values corresponding to the first USB device is equal to a value of 0x03; and
responsive to determining that the value of the second descriptor value of the set of descriptor values corresponding the first USB device is equal to the value of 0x03, program instructions to flag the first USB device as the HID.

18. The computer system of claim 15, wherein program instructions to generate the validation challenge further comprise:
   program instructions to determine whether the system includes a trusted HID;
   responsive to determining that the system includes the trusted HID, program instructions to generate the validation challenge based on one or more random actions related to the trusted HID and random temporal windows during which a respective random action of the one or more random actions is performed by a user of the system; and
   responsive to determining that each of the one or more random actions is performed by the user within the respective random temporal window, program instruction to determine that the validation challenge is passed.

19. The computer system of claim 15, further comprising:
   program instructions to determine initial sets of USB descriptor values respectively associated with one or more USB devices operatively couple to the system that are further identified as HIDs.

20. The computer system of claim 19, further comprising:
   program instructions to monitor a USB device operatively coupled to the system while the system operates, wherein monitoring includes determining a subsequent set of USB descriptor values respectively associated with the monitored USB device;
   program instructions to determine that one or more descriptor values corresponding to the subsequent set of USB descriptor values for the monitored USB device differs from the initial set of USB descriptor values respectively associated with the monitored USB device; and
   program instructions to block a USB port corresponding to the monitored USB device associated with the subsequent set of USB descriptors that differ.

* * * * *